April 13, 1937. S. MORTON Re. 20,330
KEYBOARD MECHANISM FOR TELEGRAPH APPARATUS
Original Filed April 4, 1930 2 Sheets-Sheet 1
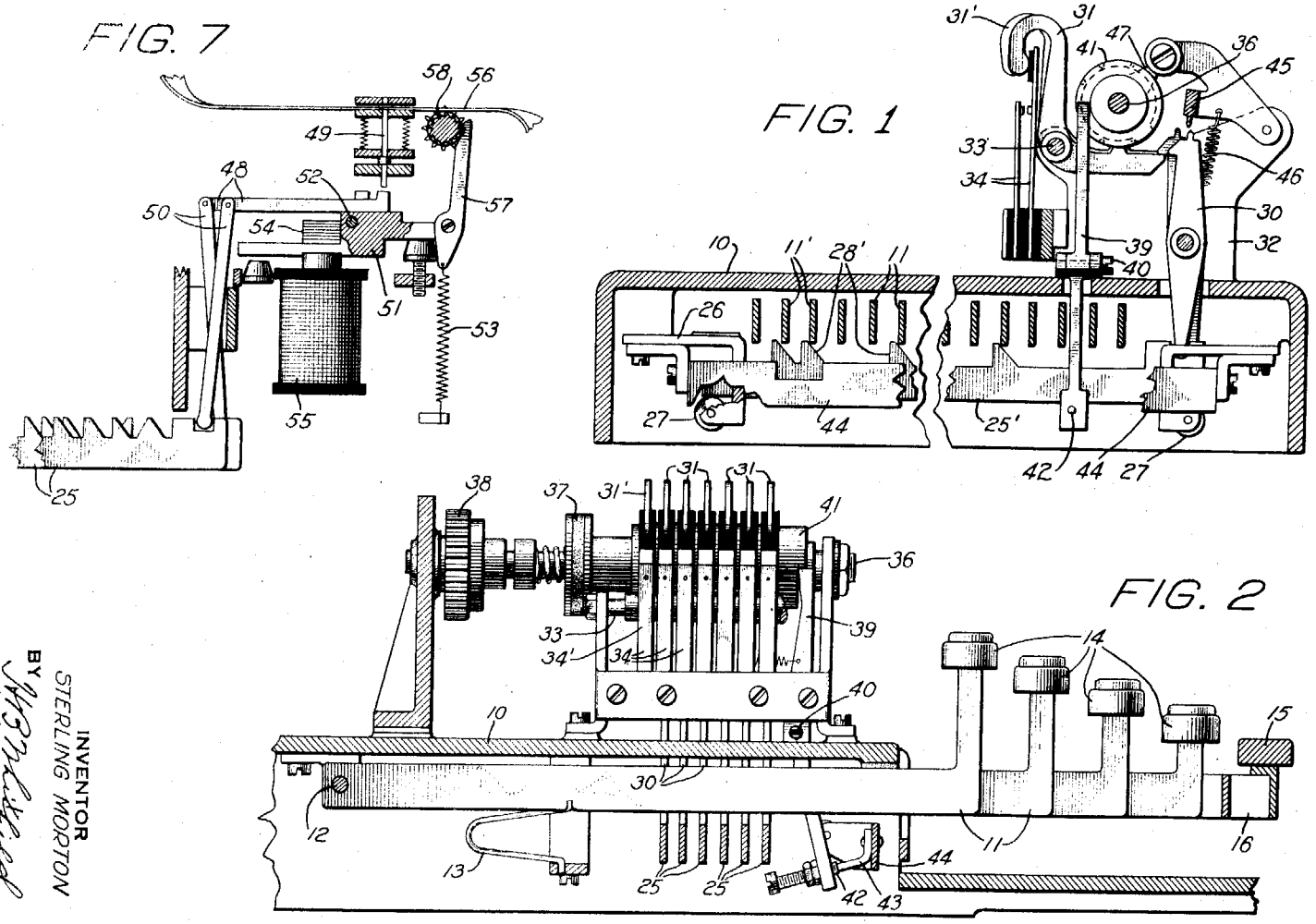
INVENTOR
STERLING MORTON
BY H. B. Whitfield
ATTORNEY April 13, 1937. S. MORTON Re. 20,330

KEYBOARD MECHANISM FOR TELEGRAPH APPARATUS

Original Filed April 4, 1930 2 Sheets-Sheet 2

INVENTOR
STERLING MORTON
BY H. B. Whitfield
ATTORNEY

Reissued Apr. 13, 1937

Re. 20,330

UNITED STATES PATENT OFFICE 20,330

KEYBOARD MECHANISM FOR TELEGRAPH APPARATUS

Sterling Morton, Chicago, Ill., assignor to Teletype Corporation, Chicago, Ill., a corporation of Delaware Original No. 1,884,807, dated October 25, 1932, Serial No. 441,465, April 4, 1930. Application for reissue June 16, 1934, Serial No. 731,005

29 Claims. (Cl. 178—17)

The invention relates to permutation keyboard mechanisms for telegraphs and the like, in which a plurality of keys serve to position a set of permutation elements in different combinations and also initiate or start the operation of the mechanism controlled by the elements. Such keyboards are employed principally in telegraph systems having a definite interval code for transmitting signals or perforating tape in accordance with a code made up of permutations of a definite number of two different conditions. Usually such codes have either five or six selecting intervals or units.

With the five unit code, it is possible to employ thirty-two different code signals or permutations of two different line conditions, and when a greater number of characters are required, they are divided into "shift" and "unshift" characters and two special five unit permutations or code signals are provided to condition the receiving apparatus to record either the "shift" or "unshift" characters. In the telegraphic keyboard now in use each individual key designates both a letter and a numeral or punctuation mark, and the same code signal transmitted or perforated in the tape by the actuation of each key, will effect the printing of a letter when the receiving apparatus has been conditioned to record "unshift" characters or letters, and of a numeral or punctuation mark in case the receiving apparatus has been conditioned to record "shift" characters. The telegraphic keyboard is thus brought within the compass or scope of a five unit code system.

With a six unit code, it is possible to employ sixty-four different code signals or permutations so that a separate code combination can be assigned to each letter, numeral and punctuation mark. If in the six unit code the lower case characters or letters use the same code combination of five intervals as in the five unit code and the sixth unit acts as a shift impulse, two keyboard arrangements are possible. In one arrangement, a key may be provided for each character. In another, the sixth pulse can be controlled by a shift key. In the latter case the keyboard will be substantially like the five unit keyboard.

A standard typewriter keyboard has been developed and is universally used. It would be a great advantage to have a telegraphic keyboard mechanism in which the keyboard is identical with a standard typewriter keyboard for the reason that such a keyboard can be more readily manipulated by those now familiar with standard typewriters. In view of the fact that a standard typewriter keyboard comprises a greater number of keys than a five unit telegraphic keyboard it is apparent that a standard typewriter keyboard is beyond the range of a five unit code system.

On the other hand, a six unit telegraphic keyboard, in which a separate key is provided for each character, has a greater range than would be required by a standard typewriter keyboard without lower case. None of these arrangements, however, result in a keyboard that is identical in arrangement with a standard typewriter keyboard.

In accordance with the present invention, a standard typewriter keyboard is provided by using the six unit code and adopting an arrangement between the two above mentioned. Part of the total number of keys are operated together with shift key and in other instances separate keys are provided for both cases. That is to say, certain pairs of characters each in opposite case groups, are allotted common keys which are operated in certain instances with a shift key which acts to control a case determining or signalling member in the selector mechanism to insert an appropriate case signal; also individual keys are allotted to certain other characters in opposite case groups and act when operated to control the case determining member. By this means, a keyboard is provided that has the exact number and arrangement of keys as the standard typewriter keyboard.

The invention further provides for a six unit telegraphic keyboard in which the mechanism for selectively determining the recording of "shift" and "unshift" characters is controlled by an additional sixth unit or interval which forms a part of each code signal, and wherein the key or keys which determine the "shift" or upper case characters can be operated like the "shift" key or keys of a standard typewriter keyboard; that is to say, said shift key or keys may be held or locked in depressed operated condition during the operation of the keys representing "shift" or upper case characters.

The invention consists in the foregoing and other features of improvement hereinafter set forth, illustrated in the preferred forms in the accompanying drawings and more particularly pointed out in the appended claims.

While applicable to other types of permutation mechanisms for telegraph transmitters or perforators, the improved keyboard is shown in the drawings as applied to a permutation mechanism similar to that shown in the prior U. S. Letters Patent to H. L. Krum No. 1,595,472, dated August 10, 1926.

In the drawings:

Figs. 1 and 2 are transverse and longitudinal sections respectively, of a telegraph transmitter to which the improved keyboard mechanism is applied.

Fig. 7 is a view similar in part to Fig. 1, illustrating the application of the mechanism to a tape perforator.

Figure 4:
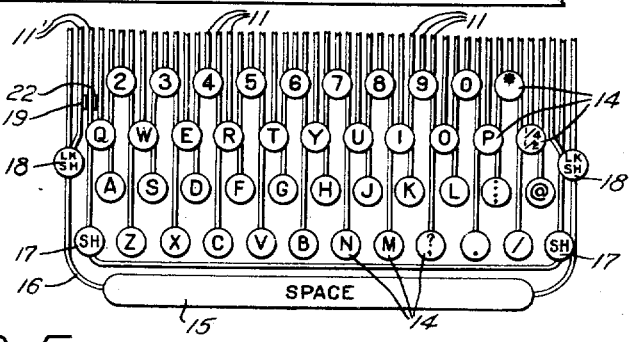
Fig. 4 is a plan view of the keyboard.

As in the construction shown in the prior Krum patent, the apparatus is provided with a cast metal base 10 within which are arranged the key levers 11 that are engaged at their rear ends by a pivot rod 12 and are upheld in normal position by springs 13. The forward upturned ends of the levers are provided with finger keys 14, the arrangement of which in four banks is like that of the standard typewriter. A space bar 15 is provided on the forward end of a bail 16 and there are preferably two shift keys 17 and 18 at each side of the keyboard, the levers of which are in the form of bails or cross-connected at their forward ends, as indicated in Fig. 4. It will be understood that the space bar and shift keys are normally upheld by springs 13 engaging the corresponding levers.

Figure 5:
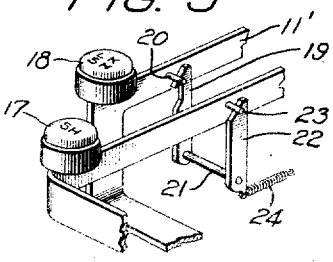
Fig. 5 is a detail view of the shift keys and locking and releasing means therefor.

As shown in Fig. 5, the shift key or keys 18 are adapted to be held down when depressed by the engagement of a spring-held dog or latch 19 with a pin 20 on one of the shift key levers. The dog is mounted on a rock shaft 21 and an arm 22 fixed to the shaft is provided with a beveled upper end arranged to be engaged by a pin 23 on the lever of the other shift key 17, so that, if the shift key 18 has been locked in depressed condition it can be released by the depression of one of the shift keys 17. A spring 24 connected to the lower end of the arm 22 normally holds the latter and the dog 19 in their forward positions.

The key levers are arranged to position a set of permutation elements or selectors in different combinations corresponding to the different signals, there being one permutation element or selector for each unit of the code. To this end, the key levers extend over and cooperate with a set of code bars which correspond in number, six in the present case, to the permutation elements or selectors. In the form shown, the code bars 25 extend transversely below the key levers with their ends guided in slots in a pair of brackets 26 and supported on rollers 27 so that the code bars are longitudinally movable to a limited extent. Each code bar is provided at one end with a notched lug which engages the lower end of a pivoted selector or permutation element, and the key levers engage the inclined faces of cam lugs 28 on the upper edges of the code bars to position the same and the selectors. Each code bar, except the sixth or case determining code bar 25', is provided with cam lugs having oppositely inclined faces, one such face being provided on each bar for each of the signal key levers, so that it together with its associated selector is moved to one of two positions by some of the keys, and to the other of such positions by the other keys. Hence the code bars 25 and the associated selectors retain their setting until the same is changed by the depression of a key lever, and the cam lugs having oppositely inclined faces cooperate with the key levers to prevent the simultaneous operation of two or more character key levers. The cam lugs 28' of the sixth code bar 25' have faces inclined in one direction only and it is held and restored to normal position by a spring 29, and the key levers engaging the cam lugs 28' of this bar serve to shift it in one direction only to its off-normal position against the tension of this spring. It is also noted that whereas the code bars 25 have cam faces corresponding to each of the signal key levers, the additional sixth code bar has cam lugs 28' correspondingly only to certain of the key levers.

Figure 3:
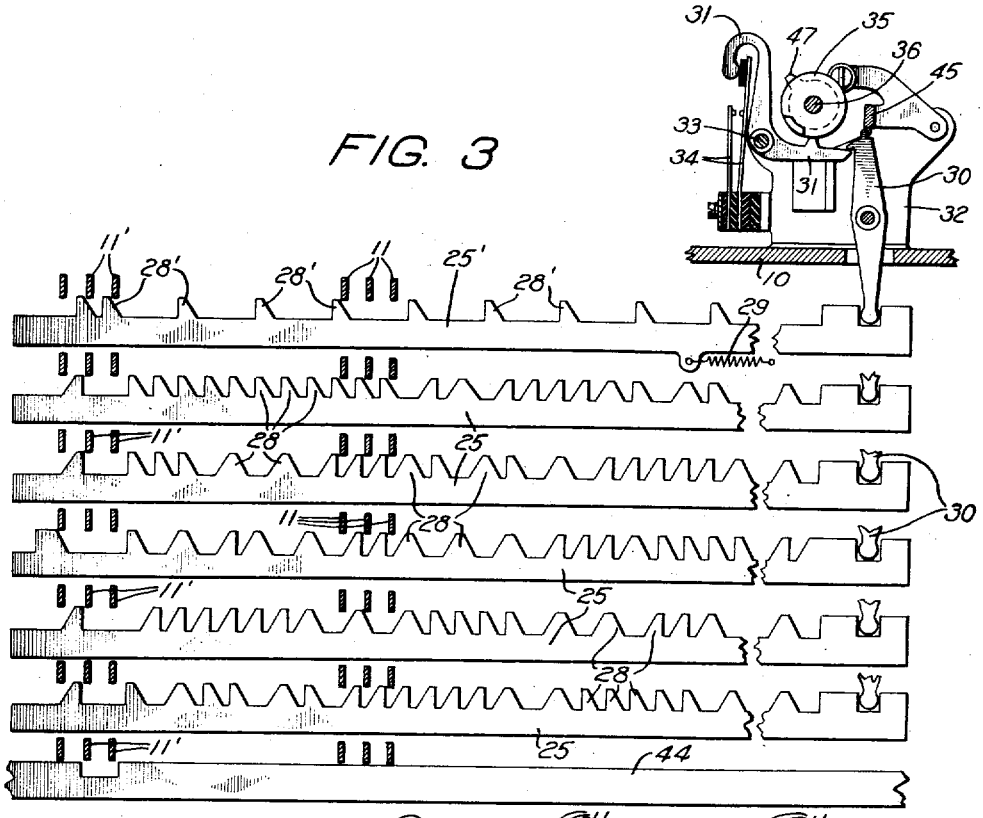
Fig. 3 is a diagrammatic view illustrating the different code bars and the start bar which are operated by the key levers.

The selectors positioned by the keys and code bars may control the operation of a transmitter switch mechanism, such for example as shown in the prior Patent No. 1,595,472 above referred to, or a tape perforator mechanism. As shown in Figs. 1, 2, and 3, the pivoted selectors or permutation members 30 control a corresponding series of switch shifters 31 which are in the form of bell-cranks and are supported on a frame 32 by a common horizontal pivot 33. The hooked upper end of each shifter 31 engages one of a pair of spring contacts 34 and a lug on the horizontal arm of each shifter engages a notched cam 35 on a shaft 36. Each cam and shifter holds the associated pair of contacts open except when the lug of the shifter drops into the notch of the cam and the notches of the several cams are spirally arranged so that, as the shaft is rotated, the pairs of contacts are closed and opened in succession unless the operation of the shifters 31 are interferred with by the selectors 30. To selectively control the transmitter contacts, the selector fingers 30 are provided at their upper ends with hooks which cooperate with the ends of the horizontal arms of the shifters 31, either to permit or prevent the operation of the corresponding contact shifters in accordance with the setting of the selectors effected by the key levers and code bars.

The transmitter cam shaft 36 is driven through the medium of a friction clutch 37, the driving member of which is connected through the medium of a gear 38 or otherwise to an operating motor. Normally the cam shaft is held against movement by a stop arm or lever 39 pivoted at 40 and spring-held in normal position with its upper end engaging the shoulder of a collar 41 on the cam shaft. An adjustable screw 42 on the lower end of the stop arm engages a lug 43 on a transverse starting bar or bail 44 which extends below the key levers and is pivotally mounted at its ends in the brackets 26. Thus the depression of any signal key lever positions the corresponding code bars and selecting fingers and shifts the start bar 44 to release the stop lever 39 and permit the rotation of the transmitter cams, thereby operating the contacts to transmit the corresponding signal. In the transmitter shown, there is an additional shifter 31' and a corresponding pair of contacts 34' for transmitting a uniform starting impulse or unit, as is usual with start-stop telegraph systems. During the greater part of the revolution of the transmitter cams, the selecting fingers 30 are each held in one or the other of its two positions by a locking bar 45 which is shifted to operative position in engagement with lugs on the upper ends of the selecting fingers by a spring 46. In the normal or zero position of the transmitter cams, the locking bar 45 is held in released position by a cam lug 47.

In the tape perforator shown in Fig. 7, the permutation elements 48 selectively control the operation of a series of punches 49, the selectors being connected by pivoted levers or arms 50 to the code bars. The ends of the selectors rest upon a hammer or actuating member 51 and are selectively positioned into and out of line with the corresponding punches. The actuator or hammer 51 is pivoted at 52, is held in normal position by a spring 53 and carries the armature 54 of a magnet 55 by which it is operated. The key levers position the code bars and punch selectors and the starting bar 44, operated by the key levers, closes the circuit of the operating magnet 55 to effect the punching of the tape 56 in accordance with the setting of the selectors. As usual, a feed pawl 57 and cooperating ratchet 58 operated by the actuating member or hammer 51, feeds the tape step by step.

Figure 6:
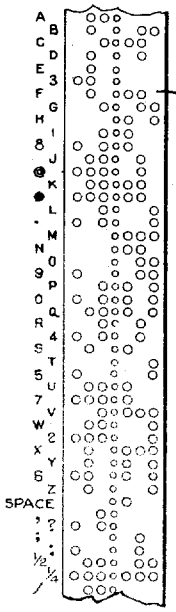
Fig. 6 is a diagram illustrating the code by means of a section of perforated tape.

Fig. 6 illustrates a tape perforated in accordance with the different characters and signals. It is noted that the "shift" characters or signals are represented by rows of perforations, each having a perforation at the extreme left-hand row. The punch for effecting the perforations of this row and the corresponding transmitter contacts are controlled by the additional or sixth code bar 25', and most of the key levers corresponding to "shift" characters are preferably arranged to engage one of the cam lugs 28' of this code bar.

This additional or sixth code bar is also provided with cam lugs beneath the shift key levers 11' so that, whenever a shift key is depressed, this code bar and the corresponding selector is moved to its off-normal or "marking" position. However, the other code bars 25 and the start bar 44 are cut away beneath the shift key levers 11', so that they are not operated when a shift key is depressed. Hence, while the depression of a shift key will shift the additional code bar 25' and the corresponding selector to "marking" position, it will not effect the complete setting of the selectors nor will it initiate the operation of the mechanism controlled by the selectors. Accordingly the keyboard may be operated like that of an ordinary typewriter, namely, a shift key can be held depressed and maintained in depressed condition while the other keys are operated. Thus, if desired, each key may be employed to transmit signals or effect the perforation of a tape in accordance with two different characters. Preferably, however, the keys are arranged in four banks, as shown in Fig. 4, and substantially in accordance with the arrangement of the standard typewriter keyboard, so that only a few signals require the operation of a shift key unless, as is not usual in telegraph practice, both upper and lower case characters are employed.

Changes may be made in the details set forth without departure from the scope of the invention as defined in the claims.

I claim as my invention:

1. In transmitting apparatus for telegraphs employing a definite interval code, a set of selectors, one for each interval of the code, transmitting mechanism controlled thereby, a plurality of finger keys including a shift key for operating said selectors in different combinations, and means operated by all the keys with the exception of the shift key for initiating the operation of said mechanism.

2. In a permutation keyboard for telegraphs or the like, a set of selectors or permutation members, mechanism at the keyboard and controlled thereby, a plurality of signal keys for conditioning said selectors in different combinations and for starting said mechanism in operation, and a shift key arranged to position one of said selectors without starting the controlled mechanism.

3. In a permutation keyboard mechanism for telegraphs and the like, a set of selectors or permutation members and a group of keys, including a shift key, for positioning said members in different combinations, said shift key being operative only upon one of said selectors and said shift key adapted to be actuated with any other key.

4. In a telegraph keyboard mechanism, a set of selectors, signal keys for positioning said selectors in different combinations, and an additional selector and an actuating key therefor, said actuating key adapted to be maintained in operated condition during the operation of said signal keys.

5. In a permutation keyboard mechanism, a set of selectors, a plurality of signal keys and a shift key for positioning said selectors in different combinations, said shift key being operative only upon one of said selectors, mechanism at said keys and controlled by said selectors, and start means for said mechanism actuated only by said signal keys.

6. In a permutation keyboard mechanism for telegraphs and the like, a set of permutation code bars, a plurality of signal keys and a shift key for positioning said code bars in different combinations, and a start bar at said keys and operated only by said signal keys.

7. In a permutation keyboard mechanism, the combination with a set of code bars and a start bar, of signal keys for operating said start bar and for positioning said code bars in different combinations, and a shift key operative only upon one of said code bars and said shift key arranged to be maintained in operated condition during the operation of the signal keys.

8. In a permutation keyboard for telegraphs and the like, a set of permutation members or selectors, a set of signal keys and a shift key for positioning said members in different combinations, and means for preventing the simultaneous operation of two or more signal keys arranged to permit the operation of a signal key with said shift key.

9. In transmitter keyboard mechanism, the combination of a set of permutation members, mechanism controlled thereby, start means for said mechanism, signal keys for positioning said permutation members and for operating said start means, a shift key operative only upon one of said permutation members, and means for preventing the simultaneous operation of two or more keys operative only on said signal keys.

10. In a permutation keyboard for telegraph transmitters and the like, a set of permutation elements, a plurality of signal keys, means operated by said keys for positioning said elements in different combinations and for preventing the simultaneous operation of two or more keys, and an additional permutation element and a shift key for operating said additional element and adapted to be maintained in actuated condition during the operation of the other keys.

11. In a permutation keyboard for telegraph transmitters and the like, a set of permutation elements, a plurality of signal keys, a shift key, and means operated by said keys for positioning said elements in different combinations, said means being arranged to prevent the simultaneous operation of two or more signal keys but permitting the operation thereof when said shift key is operated.

12. In a permutation keyboard mechanism, a set of code bars, a plurality of signal key levers for positively moving said code bars in opposite directions to position the same in different combinations, said code bars being arranged to retain their setting until the same is changed by the operation of a key lever, an additional code bar spring-held in normal position and a shift key lever operative only upon said additional code bar.

13. In a permutation keyboard mechanism, a set of code bars, a plurality of signal key levers for positively moving said code bars in opposite directions to position the same in different combinations, said code bars being arranged to retain their setting until the same is changed by the operation of a key lever, an additional code bar spring-held in normal position and operated by certain of said signal key levers, a start bar operated by each of said signal key levers, and a shift key lever operative only on said additional code bar.

14. In a permutation keyboard mechanism, a set of code bars, a plurality of signal key levers for positively moving said code bars in opposite directions to position the same in different combinations, said code bars being arranged to retain their setting until the same is changed by the operation of a key lever, and said code bars cooperating with said signal key levers to prevent the simultaneous operation of two such levers, a start bar operated by each signal key lever, an additional code bar spring-held in normal position, and a shift key lever operative only upon said additional code bar and arranged to be maintained in operated condition during the operation of the other key levers.

15. In keyboard mechanism for telegraphs employing a definite interval code, a set of permutation elements, one for each code interval, a corresponding set of code bars for positioning the permutation elements, mechanism controlled thereby, a start bar for said mechanism, a series of key levers for operating the code bars and the start bar, and a shift key lever operative only on one of said code bars.

16. In a permutation keyboard mechanism for telegraphs and the like, a set of permutation code elements, a series of keys for mechanically setting said elements, certain permutations of said elements being set by the operation of a single key, certain other permutations being set by the simultaneous operation of two keys.

17. In a telegraph keyboard, means to set up a plurality of varying signal-sending conditions, certain of said conditions having an upper case characteristic, a series of keys equal in number and corresponding in arrangement to a standard typewriter keyboard, but less in number than the number of said plurality and greater in number than the number of signals having a certain case characteristic.

18. In a telegraph keyboard, finger keys, and means in said keyboard and operated by said keys to set up a plurality of varying signal conditions, certain of said signal conditions having a shift characteristic, certain others of said signal conditions having an unshift characteristic, certain of said signal conditions having a shift characteristic being produced by the operation of a single key and others by the operation of two keys.

19. In keyboard transmitting apparatus for telegraphs employing a definite-interval code, a set of transmitting contacts, one for each interval of the code, transmitting mechanism for operating said contacts, a plurality of finger keys including a shift-key for conditioning said contacts in variant combinations, and means operated by all the keys with the exception of the shift key for initiating the operation of said mechanism.

20. In keyboard transmitting apparatus for telegraphs, a set of transmitting contacts, transmitting mechanism for operating said contacts, a plurality of character-keys for conditioning said contacts in variant combinations and for starting said mechanism into operation, and a case-shift key for conditioning one of said contacts without starting said mechanism.

21. In keyboard transmitting apparatus for telegraphs, a set of contacts, signal-sending keys and a shift key for conditioning said contacts in variant combinations, and operating means for said contacts and started only by said signal-sending keys.

22. In combination in a keyboard apparatus, a set of permutation selecting elements adapted to be conditioned in different combinations, mechanism controlled by said elements, a start device for said mechanism, and means for mechanically actuating said selecting elements and said start device comprising a plurality of character keys and a case-shift key, said character keys being operative only one at a time and each adapted to actuate said start device, and a shift key adapted to be operated with any one of the character keys for actuating one of said selecting elements, said shift key being inoperative upon said start device.

23. In telegraph signal transmitting apparatus, a keyboard, separate keys in said keyboard for characters in separate case groups, and means operable in response to the actuation of a character key on a change of case to insert an appropriate case signal.

24. In a keyboard controlled apparatus for a start-stop telegraph system, a plurality of signal key levers, a case signalling member controlled from said key levers in accordance with the case grouping of the character of a depressed key lever, and a separate case shift key lever in said keyboard effective to actuate said case signalling member independently of the simultaneous actuation of any of said plurality of key levers.

25. In a keyboard controlled apparatus, the combination according to claim 24 characterized by the provision of means for locking said case shift key lever in a depressed position.

26. In a keyboard controlled telegraph apparatus in which certain characters in opposite case groups are allotted individual key levers and certain other pairs of characters each in opposite case groups are allotted common key levers, a case shift key lever, and case signalling means selectively controlled by the depression of any of the first mentioned said individual key levers and also by said case shift key lever when a change of case is required for any character of one of said pairs allotted to common key levers.

27. In a case-signaling mechanism for keyboard controlled telegraph apparatus, a case-shift key lever, a series of permutation members, means controlled by the actuation of said case-shift key lever for setting said permutation members in accordance with a particular signal combination, and means controlled by the release of the case-shift key lever for altering the positionment of said permutation members to establish a different signal combination.

28. In a keyboard mechanism for telegraph systems, key levers, a series of members, means for setting said members permutably in accordance with a particular signal combination on the actuation of one of said key levers, means for altering the effective setting of said members in accordance with a different signal combination regardless of the position of said one key lever, and another key lever for operating said last recited means.

29. In a case-signalling mechanism for keyboard controlled telegraph apparatus, a case-shift keylever, a series of permutation members adapted to be set in accordance with the elements of a case shift signal by the movement of said case-shift keylever on depression, means whereby the setting of the permutation members are free to be altered in the depressed position of the keylever, and means whereby the series of permutation members are free to be set in accordance with the elements of a reshift signal upon the movement of said case-shift keylever on release thereof.

STERLING MORTON.